United States Patent [19]

Pernelle et al.

[11] Patent Number: 4,973,349

[45] Date of Patent: Nov. 27, 1990

[54] CHAMBER FOR THE THERMAL TREATMENT OF OBJECTS

[75] Inventors: Robert Pernelle, Marsinval; Michel Agius, Santeuil, both of France

[73] Assignee: Selas S.A., Levallois-Perret, France

[21] Appl. No.: 453,775

[22] Filed: Jan. 2, 1990

[30] Foreign Application Priority Data

Jan. 4, 1989 [FR] France ............................... 89 00048

[51] Int. Cl.[5] ............................................ C03B 5/235

[52] U.S. Cl. .................................. 65/374.13; 65/168; 65/169; 65/348; 65/346

[58] Field of Search ............ 65/168, 169, 348, 374.13, 65/346

[56] References Cited

U.S. PATENT DOCUMENTS

| | | | |
|---|---|---|---|
| 1,728,350 | 9/1929 | Littleton | 65/374.13 X |
| 3,141,756 | 7/1964 | Giffen | 65/169 X |
| 3,151,965 | 10/1964 | Patterson | 65/169 X |
| 3,199,966 | 8/1965 | O'Connell et al. | 65/169 X |
| 3,294,513 | 12/1966 | Beattie | 65/374.13 X |
| 3,337,317 | 8/1967 | Ritter | 65/169 X |
| 4,207,065 | 6/1980 | Ackermann | 65/346 X |
| 4,247,000 | 1/1981 | Marriott, Jr. et al. | 198/780 |
| 4,322,236 | 3/1982 | Sensi | 65/346 X |
| 4,450,333 | 5/1984 | Andrejco et al. | 65/374.13 X |
| 4,726,831 | 2/1988 | Fogle et al. | 65/346 X |
| 4,764,198 | 8/1988 | Lythgoe | 65/374.13 X |

FOREIGN PATENT DOCUMENTS

| | | |
|---|---|---|
| 2541440 | 8/1984 | France . |
| 2563897 | 11/1985 | France . |
| 2584485 | 1/1987 | France . |
| 2149771 | 6/1985 | United Kingdom . |

*Primary Examiner*—Robert L. Lindsay

*Attorney, Agent, or Firm*—Young & Thompson

[57] ABSTRACT

A chamber (1) for the thermal treatment of objects comprises in its interior heating means (3, 4) and means (5) to support the objects (2) to be treated, the walls of this chamber comprising a thermal insulating lining, and a portion (30) of these walls being removable to provide access to the interior of the chamber. Substantially all the internal surface of the chamber (1) is lined with cast silica-base plates (13, 14, 15, 16, 17) disposed side by side, having a coefficient of thermal expansion near zero. Used particularly in plate glass tempering furnaces.

13 Claims, 2 Drawing Sheets

CHAMBER FOR THE THERMAL TREATMENT OF OBJECTS

Figure 1:
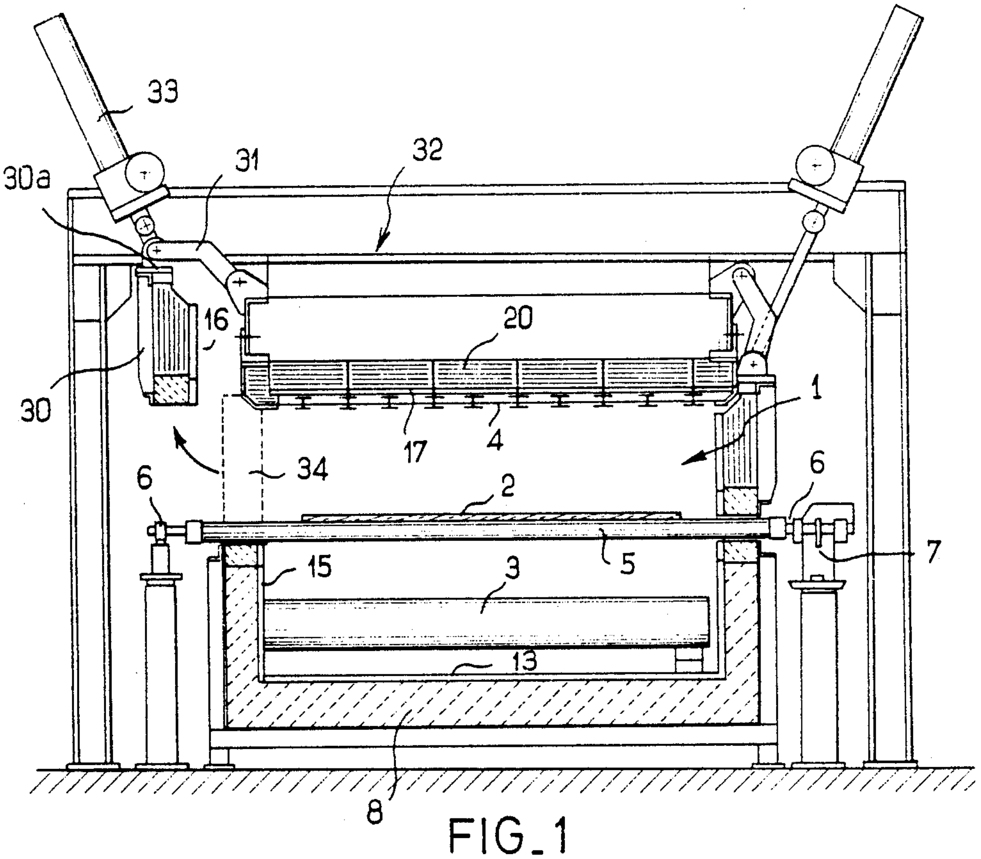

The present invention relates to a chamber for the thermal treatment of objects.

The invention particularly relates to a furnace for thermal treatment, particularly for tempering of plate glass.

In furnaces of this type, the sheets of plate glass are moved horizontally on rollers and are heated to the temperature of tempering of the glass, which is to say about 650° C.

At this temperature, the glass is soft and is thus very sensitive to the presence of dust and therefore is in danger of being contaminated by the latter.

Existing furnaces used for tempering plate glass doll not entirely protect the latter from dust. Thus, in these furnaces, the plate glass may be contaminated by the dust generated by the furnace itself and by the dust coming from outside the furnace.

The dust generated by the furnace arises essentially from the insulating lining of the latter and is generated:

during expansion and contraction of this lining due to the heating and cooling phases, by vibration engendered during movement of the upper portion, which is to say the roof of the furnace which gives access to the interior of the latter.

The object of the present invention is to overcome these difficulties of the known constructions, by providing a thermal treatment chamber and particularly a furnace which guards the objects to be treated from contamination by dust.

The invention also comprises a chamber for the thermal treatment of objects, particularly a furnace for the thermal treatment of plate glass. comprising in its interior heating means and means to support the objects to be treated, the walls of this chamber comprising a thermal insulation lining, and a portion of these walls being removable to provide access to the interior of the chamber.

According to the invention, this chamber is characterized in that substantially all of its internal surface is lined with fused silica-base plates disposed side by side having a coefficient of thermal expansion nearly zero.

These plates give off no dust, even if they are subjected to vibration. Moreover, given their coefficient of thermal expansion is nearly zero, these plates are insensitive to variations of temperature and thus give off no dust.

These plates may be of practically pure silica or can comprise silica and alumina as principal constituents.

According to an advantageous form of the invention, the chamber is thermally insulated at least in its upper part, by insulating blocks in contact with the external surface of said plates, these insulating blocks being constituted by mineral fiber clad in a ceramic fiber-base flexible sheet.

Because the mineral fiber of these blocks is enclosed in a sheet of ceramic material (which resists temperature), no dust emanating from the fibers can fall through the joints between the plates.

According to a preferred embodiment of the invention, in the upper part of the chamber, some plates are supported by supports of refractory material perpendicular to said plates, said insulating blocks of mineral fiber being situated between these supports and being in contact with the latter and with the external surface of the plates.

These supports may be of the same material as said plates.

According to an important feature of the invention, the upper wall of the chamber is fixed, while the upper part of the side walls is removable.

Because the upper wall of the chamber is fixed, no dust can be released by the latter. Moreover, the movement of the upper portions of the side walls, because of their verticality, does not cause dust to fall on the articles to be treated.

Other features and advatages of the invention will become apparent from the following description.

Figure 3:
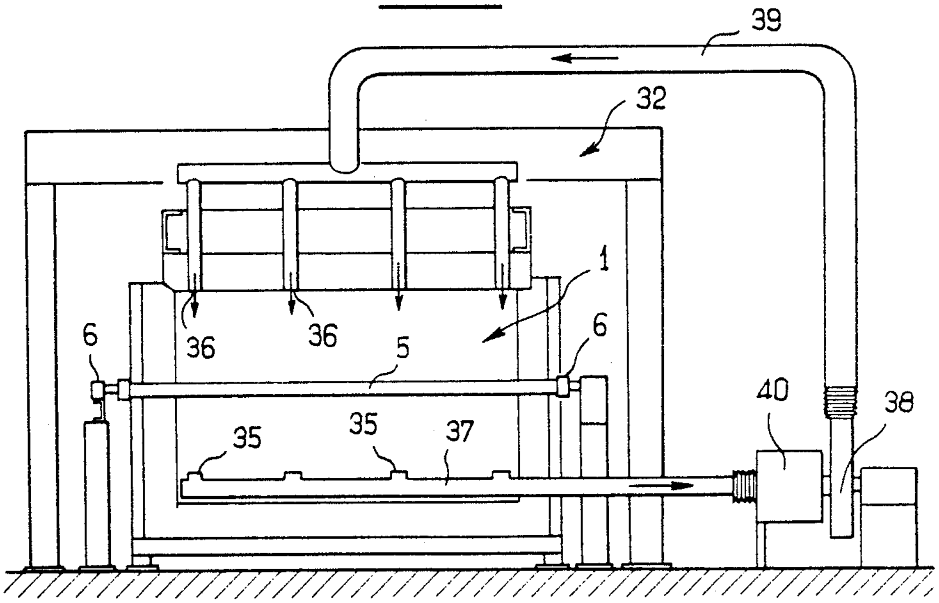
Figure 2:
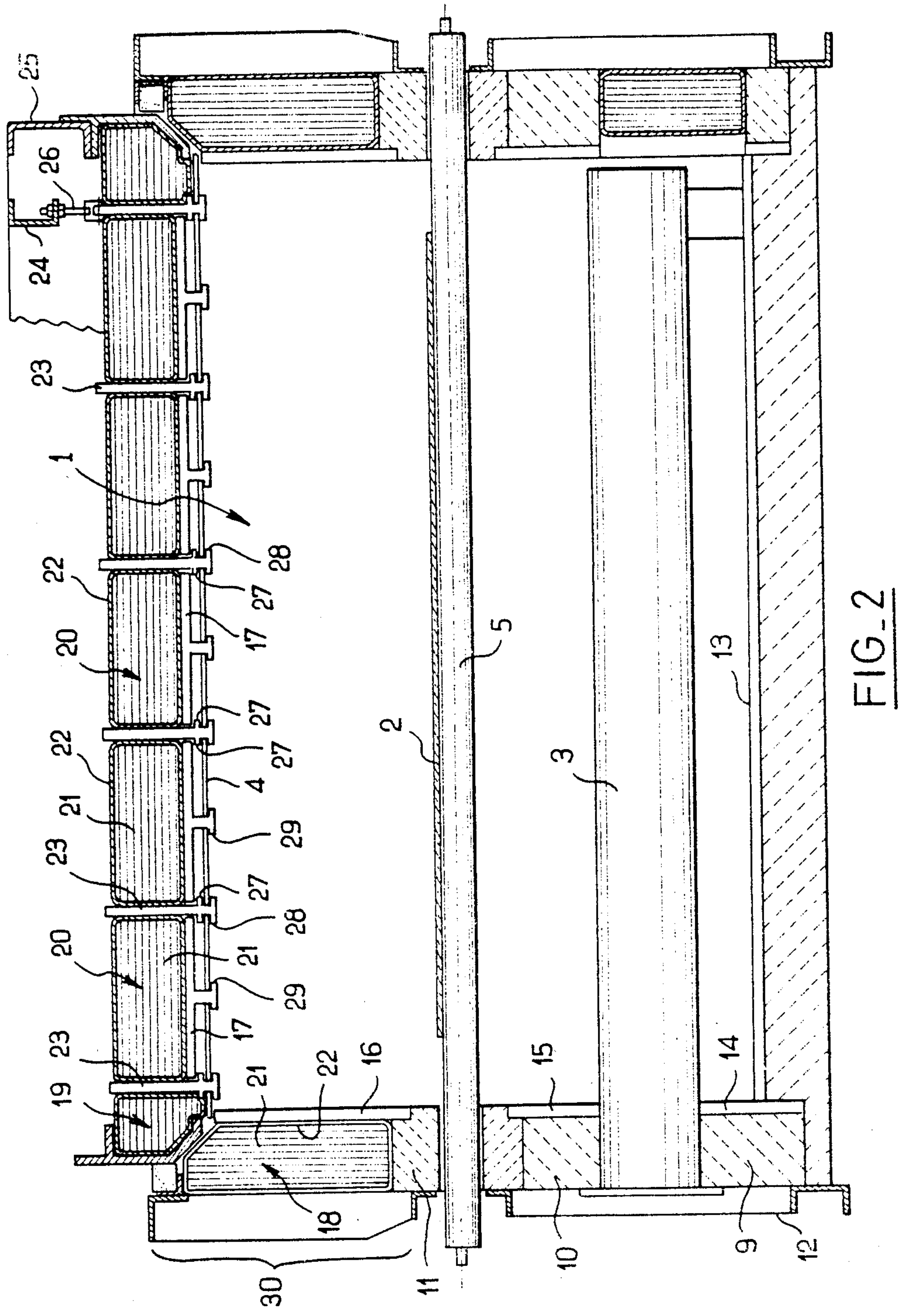

In the accompanying drawings, given by way of nonlimiting examples:

FIG. 1 is a transverse cross-sectional view of a treatment furnace for plate glass, according to the invention, FIG. 2 is a transverse cross-sectional view on an enlarged scale of the furnace chamber, FIG. 3 is a schematic transverse cross-sectional view of the furnace showing the ventilating means of the furnace chamber.

In the embodiment of FIGS. 1 and 2, the chamber 1 of the furance for tempering plate glass 2 from about 650° C. comprises in its interior lower 3 and upper 4 electric resistances and rollers 5 to support and transport the glass sheets 2 to be treated.

In the illustrsated example, the chamber 1 encloses at its upper portion tubular resistances 3 for radiant heating. The upper resistances 4 are constituted for example by Ni-Cr strips bent zig-zag.

The chamber 1 itself has the general shape of an elongated tunnel of rectangular cross section.

The sheets of glass 2 are supported by rollers 5 mounted on bearings 6 and driven in rotation by a device 7 (see FIG. 1) disposed outside the chamber.

The lower wall of the chamber 1 comprises a base 8 of refractory brick. The lateral walls also comprise, up to the level of rollers 5, refractory bricks 9, 10, 11.

These refractory bricks are clad externally by a metal casing 12.

According to the invention, substantially all the internal surface of the chamber 1 is lined with cast silica-base plates 13, 14, 15, 16, 17 disposed side by side, having a coefficient of thermal expansion nearly zero.

These plates 13, 14, 15, 16, 17 are relatively thin so as to have a low thermal inertia, and can be of practically pure cast silica, such as a product sold under the mark GLASROCK which comprises more than 99.5% silica, a density of 1.9 kg/cm$^3$, a coefficient of thermal expansion of $0.6\times10^{-6}$° C. and a thermal conductivity of 0.36 Kcal/hm° C. at 260° C. This material is indefinately resistant to a temperature of 1200° C.

Said plates may also be of ceramic enclosing silica and alumina as major constituents.

It will be seen particularly in FIG. 2 that the chamber 1 is thermally insulated in its portion (upper wall and top of the side walls), by insulating blocks 18, 19, 20 in contact with the external surface of the plates 16, 17.

These insulating blocks 18, 19, 20 are comprised of mineral fiber 21 clad in a ceramic fiber-base flexible sheet 22.

These fibers may be of rock wool which resists a temperature of 1250° C.

Given the light weight of the fiber, these plates 17 easily support the blocks 20, without the need for providing metal reinforcement.

The sheet 22 which clads the fibrous material of the blocks 18, 19, 20 may be of paper comprised of ceramic fibers (principally $SiO_2$, $Al_2O_3$) bound together by an organic binder, such as KERLANE 50 paper. This paper is easy to cut and bend.

It permits avoiding all risk of powder falling pasticularly from the fibrous material, into the joints between the plates 17. These joints maybe of very small width, given the high dimensional stability of said plates It will be seen on the other hand in FIG. 2 that in the upper portion of the chamber 1, the plates 17 are supported by supports 23 of refractory material perpendicular to the plates 17.

The insulating blocks 20 of mineral fiber are force-fitted between the supports 23 and are in contact with the latter and the external surface of the plates 17.

In the illustrated example, the supports 23 are constituted by vertical plates extending perpendicular to the plates 17 and are of the same material as these latter. It will be seen on the other hand in FIG. 2, that the support plates 23 are suspended from a fixed structure 24, 25 by means of rods 26.

Moreover, the plates 23 forming a support comprise at their lower portion and on each side a rib 27 molded integrally with them and bearing the plates 17.

On the other hand, the support-forming plates 23 and the plates 17 comprise ribs 28, 29 molded on said plates and serving to support the upper resistance. There is thus no metal member requiring holes and electrical insulation for securing the resistance 4. The emplacement and securement of the resistance 4 are thus particularly simple.

It will also be seen in FIGS. 1 and 2 that the upper wall of the chamber 1 is fixed, while the upper portion 30 of the side walls is removable.

As shown in FIG. 1, each of the upper portions 30 of the side walls is fixed to an arm 31 hinged on the one hand to the upper edge 30*a* of said portion of wall 30, and on the other hand to a fixed portion of a frame 32 of the chamber located above the upper wall of the latter. The upper edge 30*a* of said portion of wall 30 is connected to a hydraulic, pneumatic or other mechanism 33 permitting moving this portion of the wall 30 between a closed position and an open position in which it is located (see the left side of FIG. 1) above the access opening 34 to the interior of chamber 1.

FIG. 3 shows that the furnace chamber according to the invention comprises in its lower portion nozzles 35 drawing off the air contained in the interior of chamber 1 and in its upper portion nozzles 36 for blowing in the drawn-off air.

The suction nozzles 35 open into a conduit 37 connected to a fan 38 outside the chamber 1. The blowing nozzles 36 are connected to a conduit 39 which extends above the oven. On the other hand, a filter 40 is disposed outside the chamber downstream of the suction nozzles 35 and upstream of the fan 38.

All the furnace equipment which has been described contributes to avoiding any contamination of the glass sheets 2 by dust.

Thus, no dust can be released during operation of the furnace for the following reasons:

because the internal surface of the chamber 1 is lined with jointed plates 13, 14, 15, 16, 17 of cast refractory material, having a coefficient of thermal expansion substantially zero, they are not subject to crumbling under the effect of thermal shocks; moreover, their smooth surface absorbs little heat;

the insulating blocks 18, 19, 20 ensure an excellent thermal insulation; as the fibrous material of these blocks is clad with ceramic paper 22, there is no possibility of emitting dust that could pass between the joints of the plates 17;

as the plates 17 are supported by supports 23 of the same type, there is avoided any formation of a thermal bridge betwen the plates 17, and of dust; moreover, these supports 23 are shaped also to support the heating resistance 4, efficiently and simply solve the securement of this latter and the problems engendered by heating of this resistance;

as access to the interior of the oven is provided, not by displacement of the upper wall of the chamber 1 but by portions 30 of its side walls, there is avoided any risk of dust falling on the glass 2 during movement of these portions 30;

moreover, the ventilating device shown in FIG. 3 permits evacuating dust from the interior of the chamber 1 before introduction of the glass into the latter and during all the treatment of the glass.

Of course, the invention is not limited to the embodiment which has been described and the latter could be the subject of numerous modifications without departing from the scope of the invention.

Thus, the protection from dust of the furnace chamber could if necessary also be improved, by placing the interior of this chamber under a slight pressure, so as to avoid any danger of the penetration of dust into the interior of the chamber. The slight pressure could be provided by means of gas burners ensuring a heat balance.

What is claimed is:

1. Chamber (1) for the thermal treatment of objects, particularly a furnace for the thermal treatment of plate glass, comprising on its interior heating means (3, 4) and means (5) to support objects (2) to be treated, the walls of this chamber comprising a thermal insulating lining, and a portion (30) of these walls being removable to provide access to the interior of the chamber, this chamber being characterized in that substantially all its internal surface is lined with cast silica-base plates (13, 14, 15, 16, 17) disposed side by side, having a coefficient of thermal expansion nearly zero.

2. Chamber according to claim 1, characterized in that the plates are of substantially pure silica.

3. Chamber according to claim 1, characterized in that the plates enclose silica and alumina as major constituents.

4. Chamber according to claim 1, characterized in that the chamber (1) is thermally insulated at least in its upper portion, by insulating blocks (18, 19, 20) in contact with the external surface of said plates (16, 17), these insulating blocks being constituted by mineral fiber (21) clad with a ceramic fiber-base flexible sheet (22).

5. Chamber according to claim 4, characterized in that in the upper portion of the chamber (1), said plates (17) are supported by supports (23) of refractory material perpendicular to said plates, said insulating blocks (20) of mineral fiber being situated beteween these supports (23) and being in contact with the latter and the external surface of the plates.

6. Chamber according to claim 5, characterized in that the supports (23) are of the same material as said plates (17).

7. Chamber according to claim 6, characterized in that the supports (23) are constituted by plates extending perpendicular to said first plates (17).

8. Chamber according to claim 7, characterized in that the plates (23) forming a support comprise in their lower poriton and on each side a rib (27) supporting the first plates (17).

9. Chamber according to claim 8, characterized in that the plates (23) forming a support and/or said first plates (17) comprise means to support the electric heating resistance (4) situated at the top of the chamber.

10. Chamber according to claim 9, characterized in that said means are constituted by ribs (28, 29) molded on said plates (23, 17) supporting the resistance (4).

11. Chamber according to claim 1, characterized in that the upper wall of the chamber is fixed, while the upper portion (30) of the side walls is removable.

12. Chamber according to claim 11, characterized in that each of the upper portions (30) of the side walls is secured to an arm (31) hinged on the one hand to the upper edge of said wall portion (30) and on the other hand to a fixed portion of the frame (32) of the chamber located above the upper wall of the latter, the upper edge of said wall portion (30) being connected to a mechanism (33) for displacing this wall portion (30) between a closed position and an open position in which it is located above the access opening (34) to the interior of the chamber.

13. Chamber according to claim 1, characterized in that it comprises in its lower portion suction nozzles (35) for the air contained in the interior of the chamber (1) and at the upper portion blowing nozzles (36) for the drawn-off air, a filter (540) being disposed downstream of the suction nozzles (35).

* * * * *